(12) United States Patent
Shoji et al.

(10) Patent No.: US 7,333,183 B2
(45) Date of Patent: Feb. 19, 2008

(54) LASER SCANNING DEVICE

(75) Inventors: Takashi Shoji, Kasugai (JP); Ryoji Fujioka, Kasugai (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/636,424

(22) Filed: Dec. 7, 2006

(65) Prior Publication Data

US 2007/0131844 A1    Jun. 14, 2007

(30) Foreign Application Priority Data

Dec. 8, 2005  (JP) .............................. 2005-354642
Nov. 9, 2006  (JP) .............................. 2006-304377

(51) Int. Cl.
  *G01C 3/08*    (2006.01)
(52) U.S. Cl. ..................... 356/4.01; 250/205
(58) Field of Classification Search ................ 356/4.07
  See application file for complete search history.

(56) References Cited

U.S. PATENT DOCUMENTS 5,485,155 A  *  1/1996  Hibino ........................ 342/70

2002/0131033 A1 * 9/2002 Takada et al. ............. 356/4.01
2003/0090647 A1 * 5/2003 Isogai et al. ............... 356/4.01
2005/0206873 A1 * 9/2005 Tanaka et al. ............. 356/4.03

* cited by examiner

*Primary Examiner*—Thomas H. Tarcza
*Assistant Examiner*—Timothy A. Brainard
(74) *Attorney, Agent, or Firm*—Beyer Weaver LLP

(57) ABSTRACT

A laser scanning device for measuring the distance to an object in a target area by projecting laser light scanningly is provided not only with a light receiving element for receiving reflected light from the target area to detect its intensity but also with an auxiliary light receiving element for receiving reflected light from a neighboring area which will be scanned next. The gain of amplifier for amplifying the intensity of light received by the light receiving element is adjusted based on the intensity of light received by the auxiliary light receiving element so as to avoid saturation. A one-dimensional or two-dimensional light receiving element for simultaneously receiving reflected light from a plurality of areas including the target area may be used instead.

8 Claims, 11 Drawing Sheets

LASER SCANNING DEVICE

This application claims priority on Japanese Patent Applications 2005-354642 filed Dec. 8, 2005 and 2006-304377 filed Nov. 9, 2006.

BACKGROUND OF THE INVENTION

This invention relates to a laser scanning device for calculating a distance to a target object by projecting a laser beam and measuring the intensity of reflected light.

In order to prevent traffic accidents involving automobiles, it is becoming a common practice in recent years to make use of optical distance measuring apparatus having a laser scanning device to use a near infrared laser beam to scan the front and to detect the presence or absence of an object in front (such as a front going vehicle, an obstacle or a pedestrian) and to measure its distance by receiving its reflected light.

FIG. 10 shows the structure of a laser scanning device. Numeral 101 indicates a distance measuring part serving to cause a light projecting part 102 to project a laser beam. Reflected light of the beam projected from the light projecting part 102 is received by a light receiving element 103 and is thereby converted into an electrical signal according to the intensity of the received light. This electrical signal is amplified by an amplifier 104 and then inputted to an intensity recording part 105 where the intensity of the received light is recorded. As shown in FIG. 11A, the intensity recording part 105 serves to detect a peak in the intensity of the received light along a time axis and outputs the timing for receiving light to the distance measuring part 101. The distance measuring part 101 measures the distance to an object from the delay time measured from the timing of light projection from the light projecting part 102 and the timing of receiving light by the intensity recording part 105.

In the above, the intensity recording part 105 may be adapted to represent the light intensity in terms of specified steps (such as 0-255) and, if a signal exceeding a recordable maximum intensity (MAX) is inputted, to record such a saturated situation by showing the intensity to have that maximum intensity (MAX), as shown in FIG. 11B. In such a situation, it is no longer possible to detect a peak in the intensity. In other words, prior art devices of this type had the problem of not being able to measure the distance of an object in front or to obtain an erroneous distance.

In view of this problem, Japanese Utility Model Publication Jikkai 5-23176, for example, proposed to reduce the gain of the amplifier upon detecting a saturated condition of the electrical signal. Japanese Patent Publication Tokkai 7-146368 disclosed a radar device adapted to alternately measure at a maximum gain and a reduced gain so as to be able to detect both objects with strong reflected light and objects with weak reflected light. Japanese Patent Publication Tokkai 8-220234 disclosed a method of controlling the gain for each area such that the received intensity is stable and to the make this central angle of scan in the region with this stabilized reception intensity as the object of measurement.

Each of the technologies described above requires, however, that the intensity of received light be measured preliminarily in the target area so as to thereafter control the gain such that saturation will not occur by the received signal. If such preliminary measurements are necessary for controlling the gain, extra time will have to be spent for this purpose and the time efficiency of the measurement is adversely affected. If the gain control is to be carried out frequently (such as every time a measurement is made), an accurate measurement of distance may become possible but it will take twice as long to do so with the preliminary measurement and the actual measurement. This means that the efficiency drops to 50%.

SUMMARY OF THE INVENTION

It is therefore an object of this invention to provide a laser scanning device capable of controlling the gain nearly over the entire target area without incurring any time loss.

A laser scanning device according to this invention may be characterized as comprising a light projecting part for projecting laser light to irradiate a target area scanningly in a specified orientation for carrying out distance-measuring operations, a light receiving element (herein referred to as the main light receiving element) for receiving reflection of this laser light from the target area and detecting intensity of the received reflected light, another light receiving element (herein referred to as the auxiliary light receiving element) for receiving reflected light from another area (herein referred to as the preceding area) which is neighboring to and displaced from the target area by a specified angle and detecting intensity of reflected light from this preceding area, amplifying means (herein referred to as the amplifiers) for amplifying intensities detected by the aforementioned main and auxiliary light receiving elements, a gain control part for adjusting the gain of the amplifiers for the next one of the distance-measuring operations based on the intensity of the projected laser light and the intensity of reflected light detected by the auxiliary light receiving element, and a measuring part for measuring the distance to an object from the projection timing of the projected laser light and the timing of receiving reflected laser light each time the aforementioned specified angle is scanned.

In summary, what is herein referred to as the auxiliary light receiving element is provided in addition to the main light receiving element for receiving light from the current target area (or the distance-measuring area to which the distance is intended to be measured). This additional (auxiliary) light receiving element serves to receive light reflected from an area (preceding area) displaced from the target area, or the area where the distance-measuring operation will be carried out next. Thus, the preceding area is displaced by a specified angle from the target area, this specified angle depending on the mode of the scan. The gain control part serves to calculate the ratio of the intensity of the received light with respect to the irradiation intensity from the irradiation intensity at the preceding area and the intensity detected by the auxiliary light receiving element and to thereby carry out a gain adjustment of the amplifier. If the intensity of irradiated light has a normal distribution, the irradiation intensity at the preceding area can be calculated from the angle between the target (distance-measuring) area and the preceding area. In this manner, the gain of the amplifiers can be adjusted such that saturation can be prevented at the time of the distance-measurement by the main light receiving element.

A laser scanning device according to a second embodiment of this invention may be characterized as scanning reciprocatingly in two directions which are herein referred to as the going direction and the returning direction (rather than just in one direction) and wherein the aforementioned auxiliary light receiving element includes two elements which are herein referred to as a first element and a second element, the first element serving to receive reflected light from a preceding area in the going direction, the second element serving to receive reflected light from another preceding area in the returning direction. The gain control part adjusts the gain of the amplifiers for the next distance-measuring operation based on the intensity of the projected laser light and the intensity of reflected light detected by the first element when the laser scanning device is scanning in the going direction and on the intensity of the projected laser light and the intensity of reflected light detected by the second element when the laser scanning device is scanning in the returning direction. In other words, the second embodiment of the invention is for adjusting the gain when the scan is carried out reciprocatingly in two mutually opposite directions.

A laser scanning device according to a third embodiment of this invention may be characterized as being the same as the first embodiment described above except that both the main and auxiliary light receiving elements are incorporated in a single one-dimensional light receiving element structured such that reflected light from a plurality of areas is received simultaneously, including the target area, a preceding area which is displaced by a specified angle from the target area in the going direction as defined above and another preceding area which is displaced by the specified angle from the target area in the returning direction. An amplifier serves to amplify intensity of reflected light from the target area. A gain control part serves to adjust the gain of the amplifier for the next one of the distance-measuring operations based on the intensity of the projected laser light and the amplified intensities by the amplifier. A measuring part serves to measure the distance to an object from the projection timing of the laser light and the timing of receiving reflected laser light each time the specified angle is scanned.

A laser scanning device according to a fourth embodiment of this invention may be characterized as being the same as the third embodiment described above except that the one-dimensional light receiving element is replaced by a two-dimensional light receiving element adapted to simultaneously receive reflection of the laser light from a plurality of two-dimensionally defined areas including the target area and a plurality of preceding areas which are displaced by a specified angle from the target area in two-dimensionally varied directions and to thereby detect intensities of the received reflected light. By using such a two-dimensional light receiving element, the direction of scan is not limited to the horizontal and/or vertical direction. Even if a scan is carried out in a diagonal direction, the intensity of received light from an area corresponding to the next target area can be detected preliminarily and the gain can be adjusted for the time of measurement such that saturation can be avoided.

DETAILED DESCRIPTION OF THE INVENTION

Figure 1A:
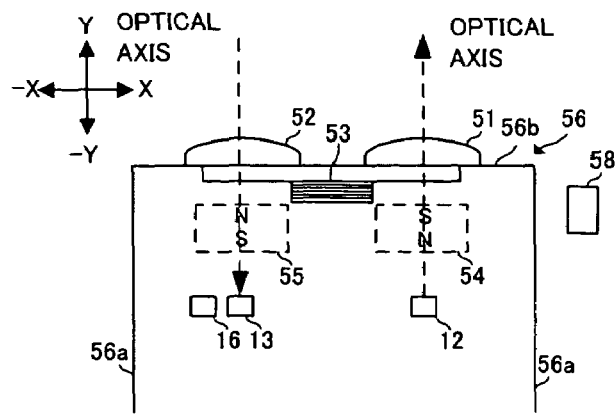
FIG. 1A is a schematic view of the light projecting part of the laser scanning device.

FIG. 1A is a schematic structural diagram of a laser scanning device according to an embodiment of this invention adapted to be used in a front image taking device carried on an automobile, being set at its front portion for projecting laser light (such as a near infrared laser beam) to the front of the automobile so as to detect the presence or absence of an object as well as the direction and distance thereto by receiving reflected light therefrom with a photodiode serving as a light receiving element. In what follows, the upward direction in a figure will be referred to as the +Y direction, the downward direction as the −Y direction, the rightward direction as the +X direction and the leftward direction as −X direction.

As shown in FIG. 1A, a light projecting part 12 including a semiconductor infrared laser element and a main light receiving element 13 for making measurement with sensitivity to infrared are set such that their optical axes are in the Y-direction. Converging lenses 51 and 52 for converging light are provided in the direction of the optical axes of the light projecting part 12 and the main light receiving element 13, respectively. These lenses 51 and 52 are affixed to a common frame 56.

FIG. 1A shows the device in a stationary condition. When the device is in this condition, the optical axes of the light projecting part 12 and lens 51 coincide, and those of the main light receiving element 13 and lens 52 coincide. The light projecting part 12 and the main light receiving element 13 are respectively at the foci of lenses 51 and 52 such that the infrared light generated by the light projecting part 12 propagates as a beam in the Y-direction by means of lens 51 and the main light receiving element 13 serves to receive the laser beam arriving in the Y-direction.

The frame 56 is approximately U-shaped, comprising a front panel 56b and legs 56a to the right and to the left. The lenses 51 and 52 are affixed at an opening formed on the front panel 56b. The legs 56a are made of elastic members in the form of a plate spring such that the front panel 56b as well as the lenses 51 and 52 attached thereto can undergo an oscillating motion.

An electromagnetic coil 53 is provided at the center of the surface of the front panel 56b facing the light projecting part 12. Permanent magnets 54 and 55 are provided near the optical axes of the light projecting part 12 and the light projecting part 12 flanking the electromagnetic coil 53 so as not to be in the way of the optical axes. As shown, these permanent magnets 54 and 55 are set such that they show different polarities on the side of the lenses and on the side of the main light receiving element 13.

An AC current is applied to the electromagnetic coil 53 from a driver circuit (not shown) so as to generate an AC magnetic field. The electromagnetic coil 53 is pulled to the right or to the left, depending on the polarity of the AC magnetic field. In the example of FIG. 1A, the electromagnetic coil 53 is pulled towards permanent magnet 54 when the polarity of the electromagnetic coil 53 on the side of the permanent magnets 54 and 55 is N, and towards permanent magnet 55 if this polarity is S.

Figure 1B:
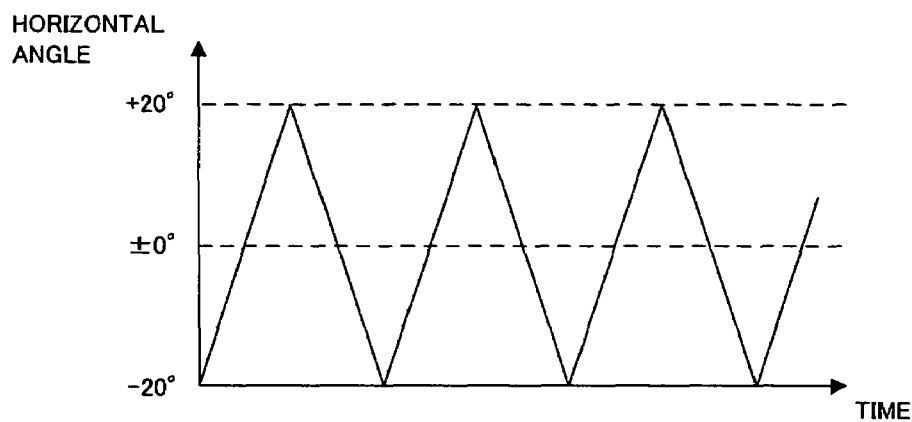
FIG. 1B shows the horizontal scan and FIG. 1C shows the change in the direction of laser light projection in the vertical direction.

By this pulling force, the front panel 56b of the frame 56 moves as a whole to the left and to the right. Since the legs 56a of the frame 56 are made of an elastic member such as a planar spring, their elastic force serves to cause the frame 56 to return to the condition shown in FIG. 1A when the aforementioned pulling force ceases to operate. Thus, the front panel 56b of the frame 56, together with the lenses 51 and 52, undergoes an oscillatory motion to the left and to the right (in the +X and −X directions) with the angular position changing in a triangular waveform as shown in FIG. 1B by the pulling force of the AC current in the electromagnetic coil 53 and the elastic force of the legs 56a. In FIG. 1B, the angle means the angle of the center line of the light projecting part 12 of the lens 51 or that of the main light receiving element 13 and the lens 52 with respect to the Y-direction, or the direction of the optical axes.

Since the light projecting part 12 and the main light receiving element 13 are at the focal points of the lenses 51 and 52, as explained above, the line connecting the centers of the light projecting part 12 and the lens 51 becomes the direction of the projected laser beam and the line connecting the centers of the main light receiving element 13 and the lens 52 becomes the direction in which light is received.

An angle sensor 58 is provided at one side of the frame 56 for detecting the angular position of the oscillating frame 56.

Figure 1C:
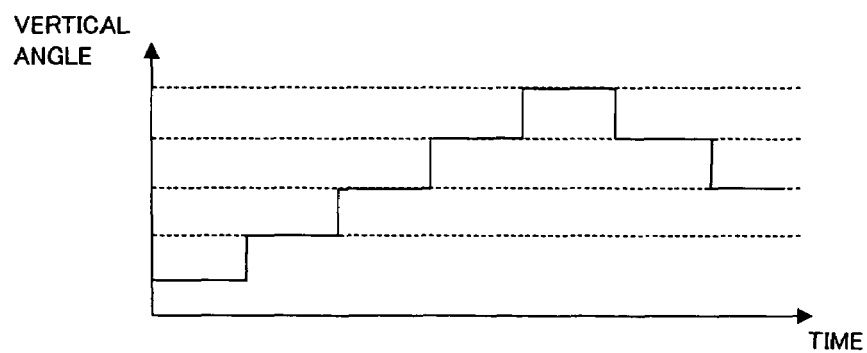

The angle of laser light projection may be adapted to change in the vertical direction at the end positions of the horizontal motion as shown in FIG. 1C. In this manner, a two-dimensional scan becomes possible by the laser beam. When the scan is one-dimensional in the horizontal direction, the lens characteristics may be adjusted such that a vertically more elongated beam may be projected forward and that a beam with a sufficiently large vertical range can be projected.

Figure 2:
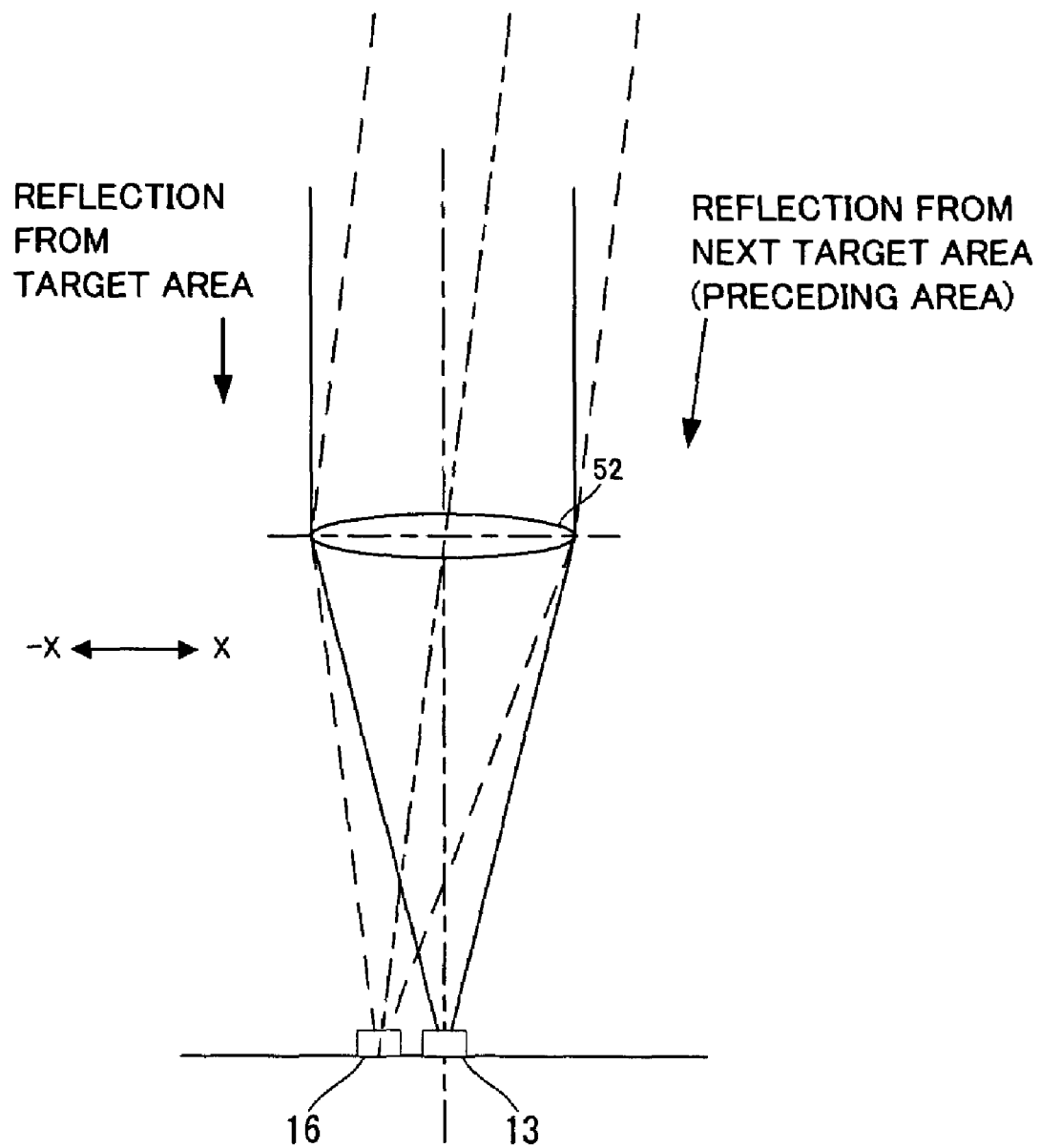
FIG. 2 is a drawing for showing the direction of reflected light.

The laser scanning device is further provided with another light receiving element for gain adjustment herein referred to as the auxiliary light receiving element 16. This is set very close to the aforementioned main light receiving element 13 (on its left-hand side according to the example shown in FIG. 1A). FIG. 2 shows how the two light receiving elements 13 and 16 serve to function. The auxiliary light receiving element 16, like the main light receiving element 13, is set on the focal plane of the lens 52 but is displaced somewhat to the left from the straight line connecting the centers of the main light receiving element 13 and the lens 52. In other words, the optical axis of the auxiliary light receiving element 16 (or the direction in which it received light) is different from the direction in which the main light receiving element 13 receives light. If the laser scanning device is scanning from left to right (from −X to +X directions) with the light receiving elements 13 and 16 thus set, the area from which light is received by the auxiliary light receiving element 16 will be referred to as the "preceding area" because it is next to the area (referred to as the "target area") from which reflected light is then being received by the main light receiving element 13.

Figure 3A:
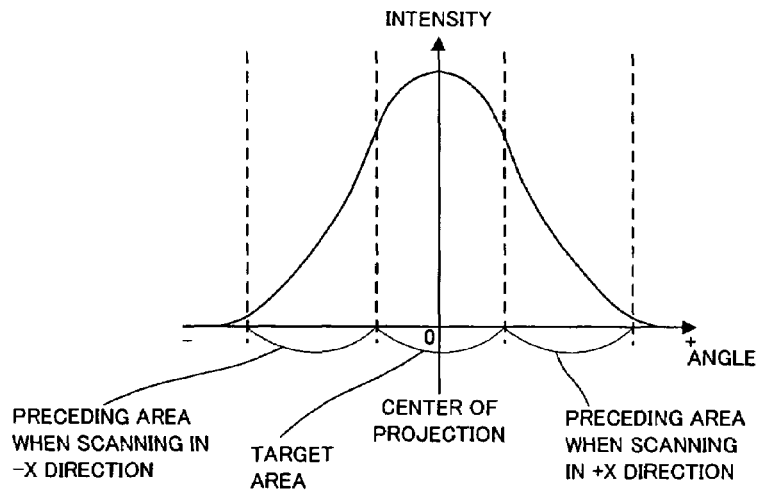
FIG. 3A shows the intensity distribution of projected laser light.
Figure 3B:
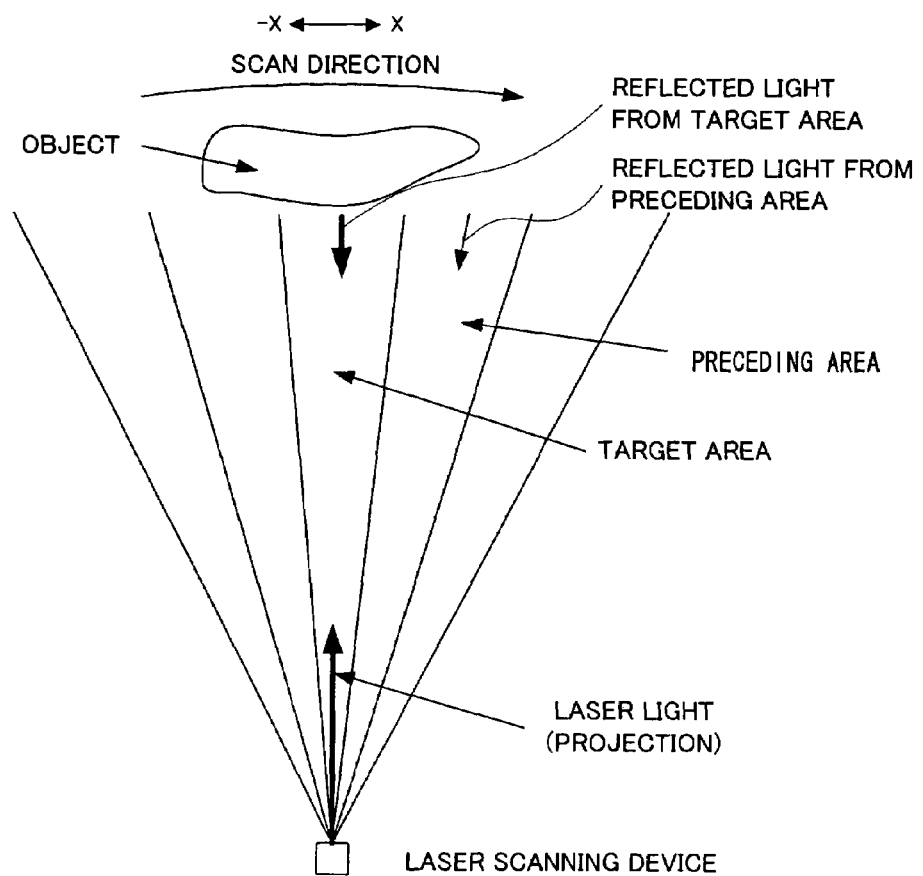
FIG. 3B shows the relationship between the target area and the preceding area.

Explained even more in detail, the preceding area is the area from which the main light receiving element 13 will be receiving light next and will be the target area in the next scan. FIG. 3A shows the intensity distribution of projected laser light and FIG. 3B shows the relationship between the target area and the preceding area. Although FIG. 2 shows the target area and the preceding area nearly totally overlapped with each other, it is because reflected light from both areas is being receiving through the same lens 52. If each area has a fan-shaped extension and is sufficiently separated from the laser scanning device, as shown in FIG. 3B, the overlapped portion becomes smaller. If there is a gap between the target and preceding areas, on the other hand, there is a danger of failing to detect an object. For this reason, the two areas are intentionally caused to overlap somewhat with each other.

The laser light is in the form of a beam but since its cross-sectional area has a finite size, its intensity has a normal distribution as shown in FIG. 3A with the optical axis at its center. This means that the auxiliary light receiving element 16 is expected to be normally receiving weaker reflected light than the reflected light from the target area. The weaker reflected light being received by the auxiliary light receiving element 16 is from the preceding area which is displaced from the current target area by a specified angle in the direction of the scan, as shown in FIG. 3B. The intensity of this weaker reflected light from the preceding area can be calculated from the distribution shown in FIG. 3A. Since the distribution is a normal distribution, the calculation is possible from the angle from the optical axis.

Since the reflected light from the preceding area is thus received preliminarily by the auxiliary light receiving element 16 (preceding the reception of reflected light therefrom by the main light receiving element 13), it becomes possible according to this invention to adjust the gain of the amplifier connected to the main light receiving element 13 such that there will be no saturation by the received light when the main light receiving element 13 comes next to measure the intensity of reflected light from the target area. In other words, the ratio of the intensity of the received reflected light with respect to the intensity of light irradiating the area which will next come to be the target area can be obtained from the intensity of the reflected light from the preceding area received by the auxiliary light receiving element 16 and the irradiated intensity of light at the preceding area. This means that the intensity of the received light when the area is irradiated at the full power at the center of the optical axis can be estimated, and the gain at the time of measuring the distance can be adjusted.

Figure 4:
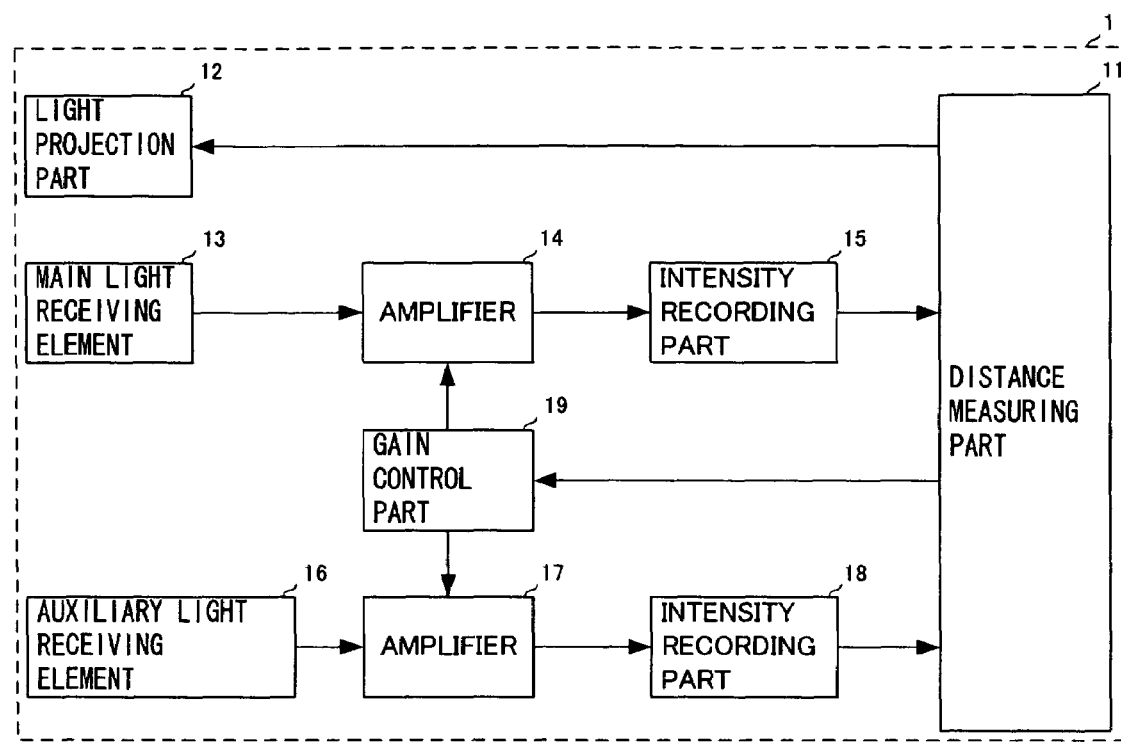
FIG. 4 is a block diagram of a laser scanning device of this invention.

FIG. 4 is referenced next to explain the detailed structure of a laser scanning device 1 of this invention. As shown in this block diagram, this laser scanning device 1 is provided with a distance measuring part 11, a light projecting part 12, a main light receiving element 13 for distance measurement, an amplifier (sometimes referred to as the first amplifier) 14, an intensity recording part (sometimes referred to as the first intensity recording part) 15, an auxiliary light receiving element 16 for gain adjustment, another amplifier (sometimes referred to as the second amplifier) 17, another intensity recording part (sometimes referred to as the second intensity recording part) 18 and a gain control part 19. The distance measuring part 11 is connected to the light projecting part 12, the intensity recording parts 15 and 18 and the gain control part 19. The gain control part 19 is connected to the amplifiers 14 and 17. The first amplifier 14 is connected to the main light receiving element 13 and the first intensity recording part 15. The second amplifier 17 is connected to the auxiliary light receiving element 16 and the second intensity recording part 18.

The distance measuring part 11 serves to cause the light projecting part 12 to project laser light and to continuously receive data on the intensity of received light from the intensity recording parts 15 and 18. The distance measuring part 11 can thus learn the timing of receiving light (the light reception timing) from the data on the intensity of received light and obtains the distance to an object by calculating the difference between the timing of projecting light by the light projecting part 12 (the light projection timing) and the light reception timing. Still another function of the distance measuring part 11 is to cause the gain control part 19 to adjust the gains of the amplifiers 14 and 17.

The light projecting part 12 comprises a semiconductor infrared laser element, as explained above, and serves to project laser light to the front of the automobile in response to an instruction from the distance measuring part 11. The laser light is adjusted to be projected so as to scan a specified horizontal angular range such as 20° to the left and to the right. The adjustment of the angle of projection is carried out by controlling the AC current to the electromagnetic coil 53.

The main light receiving element 13 and the auxiliary light receiving element 16 each serve to output an electrical signal of a level corresponding to the intensity of the reflected light that is received. As explained above, the auxiliary light receiving element 16 is located very close to the main light receiving element 13. The reflected light from the target area is received by the main light receiving element 13 while the reflected light from the preceding area as defined above is received by the auxiliary light receiving element 16.

The amplifiers 14 and 17 serve to amplify the electrical signals outputted from the light receiving elements 13 and 16, respectively, and their gains are adjusted by the gain control part 19.

The intensity recording parts 15 and 18 each serve to record the intensity of the gain-adjusted electrical signal outputted from the respectively connected amplifier and to transmit to the distance measuring part 11 data related to the recorded intensity of the received light. The intensity of received light is represented in steps such as 0-255. The first intensity recording part 15 records the intensity of light from the target area received by the main light receiving element 13, while the second intensity recording part 18 records the intensity of light from the preceding area received by the auxiliary light receiving element 16. The intensity recording parts 15 and 18 transmit the data on the intensities of received light to the distance measuring part 11.

The gain control part 19 adjusts the gains of the amplifiers 14 and 17 according to instructions from the distance measuring part 11. Although the intensity of projected light is weaker at the preceding area than at the target area, there is a possibility of the occurrence of saturation by the intensity of received light if a highly reflective object appears suddenly and the auxiliary light receiving element 16 receives reflected light with a very high intensity. For this reason, it is preferable to adjust the gain of the second amplifier 17 lower than the value normally estimated from the immediately previous measurement.

When the intensity of light received from the first intensity recording part 15 becomes a preset value, the distance measuring part 11 judges that an object is present. A peak of the intensity is further determined on the time axis, this being determined as the light reception timing. The distance measuring part 11 obtains the distance to the object by calculating the time difference between the light projection timing at which an instruction was transmitted to the light projecting part 12 to project laser light and the light reception timing. The direction of the object can also be obtained from the angle of the laser light at the light projection timing and the light reception timing. Thus, the distance measuring part 11 can obtain direction and distance data of surrounding objects from such light projection and reception timings and directions.

The distance measuring part 11 may be connected, for example, to an automobile control part (not shown), serving to output such direction and distance data of objects. These data may be used by the automobile control part for controlling its own speed at a constant rate or for emergency-stopping in order to prevent contact with an obstacle.

From the difference in projection angles at the target area and the preceding area and the distribution of projection intensity shown in FIG. 3A, the distance measuring part 11 can learn the projection intensity at the preceding area. The difference in projection angle between the two areas can be obtained by reading the angular difference between the current target area and the preceding target area by means of the angle sensor 58 and by using this angular difference as the difference between the projection angles of the target and preceding areas.

From the irradiation intensity at the preceding area thus calculated and the intensity of reflected light received from the second intensity recording part 18, the ratio of the intensity of the reflected light with respect to the irradiation intensity at the preceding area can be obtained. The distance measuring part 11 makes use of this ratio to set a corresponding gain to the first amplifier 14 for the area where the measurement will be carried out at the next scan timing. In other words, as the distance to an object is measured by means of the main light receiving element 13, the intensity of reflection at the next target area is measured by the auxiliary light receiving element 16 to calculate the adjustment value of the gain such that the adjustment of the gain can be achieved nearly all over the area to be measured without wasting time. If saturation occurs when a distance is measured by using a calculated gain, a lower gain may be set to measure the distance again.

Figure 5:
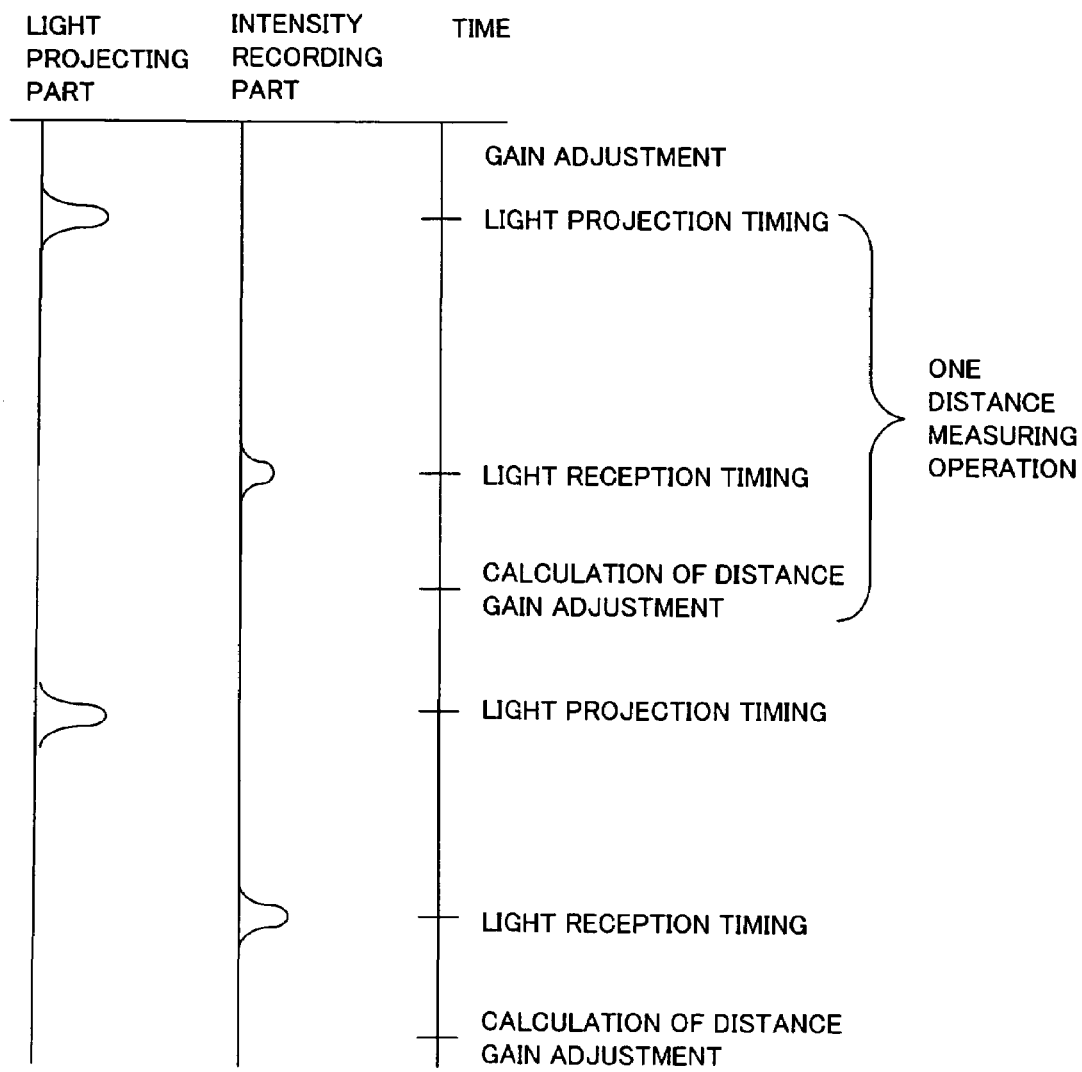
FIG. 5 is a timing chart of processes including light projection, light reception and gain adjustment.

FIG. 5 shows the time sequence of the process explained above, showing the light projection timing, the light reception timing, the calculation of distance and the adjustment of gain as a time sequence. As shown, the laser scanning device 1 projects laser light (projection timing), receives reflected light (reception timing), obtains a corrected gain from the projection irradiated intensity and the intensity of the reflected light from the preceding area and makes a correction. It also calculates the distance to an object from the difference between the light projection timing and the light reception timing. This series of operations is referred to as one distance-measuring operation, and a distance-measuring operation is carried out each time a specified angular scan is performed. When the first distance-measuring operation is carried out, the gain is adjusted preliminarily. This preliminary gain adjustment is carried out by a so-called "virtual measurement" to be explained below.

Figure 6:
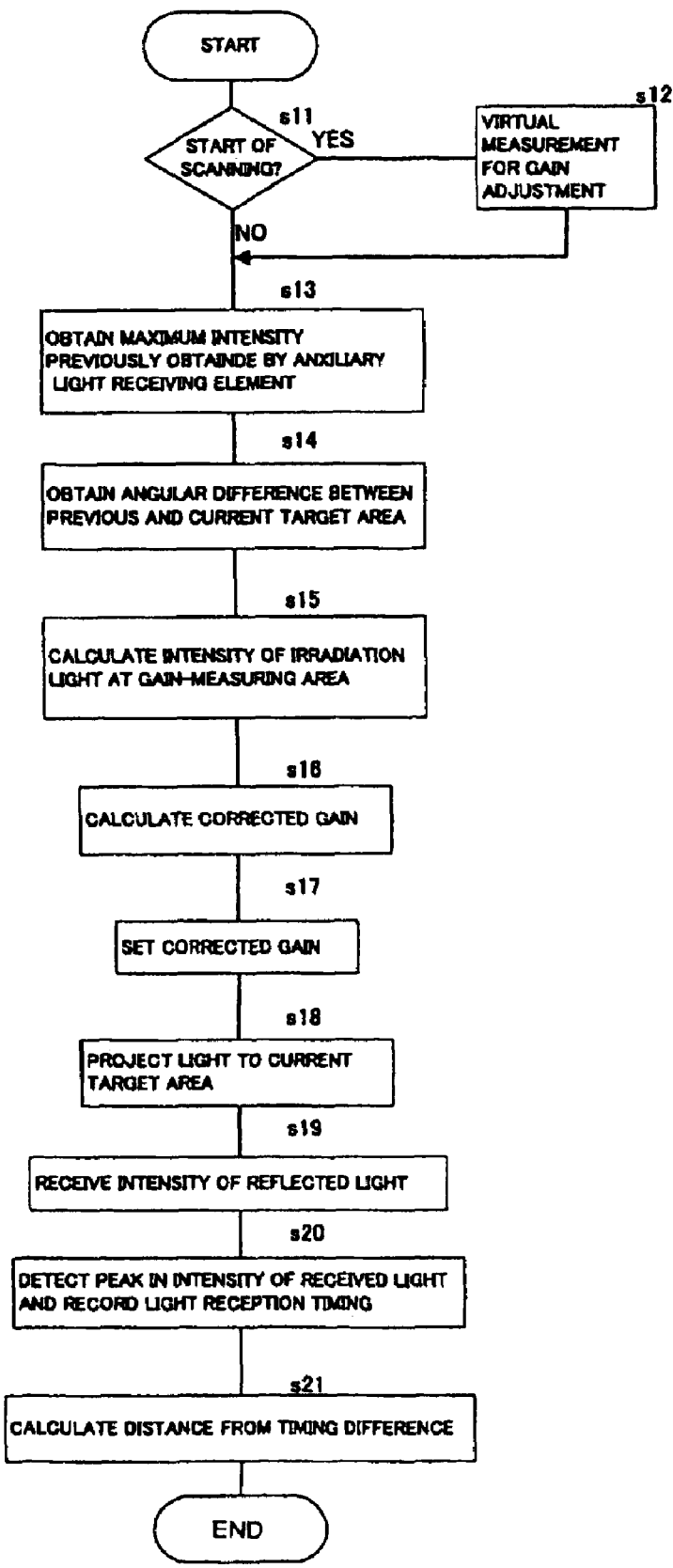
FIG. 6 is a flowchart of operations by the laser scanning device of FIG. 4.

FIG. 6 is referenced next to explain the distance-measuring operation of the laser scanning device 1 more in detail. This is a flowchart of operations to be carried out for each target area. To start, the distance measuring part 11 checks whether or not it is the start of a scan (Step S11), or whether or not it is the first distance-measuring operation in the direction of the scan. If a change is being made from a scan in the direction of +X to another scan in the direction of −X, for example, the first measurement in the scan in the direction of −X becomes the start of a scan. If the distance measuring part 11 determines that it is the start of a scan (YES in Step S12), a virtual measurement is carried out for gain adjustment (Step S12) by preliminarily projecting laser light at an angle such that the starting distance-measuring area of the scan will become the preceding area and measuring the intensity of received light by means of the auxiliary light receiving element 16.

After the virtual measurement is completed, or if it is determined in Step S11 that it is not the start of a scan, the distance measuring part 11 obtains the maximum intensity of received light previously measured by the auxiliary light receiving element 16 (Step S13) and the angular sensor 58 is used to obtain the angular difference between the previous target area and the current target area (Step S14). In the case of the start of a scan, a predetermined value of angular difference may be inputted.

Thereafter, the irradiation intensity at the preceding area (at the previous time) is calculated from the irradiation intensity at the target area and the angular difference (Step S15). As explained above, this can be done from the difference in the projection angle between the target area and the adjoining preceding area and the distribution of irradiation intensity shown in FIG. 3A. The ratio of the intensity of the reflected light with respect to the irradiation intensity is obtained from the irradiation intensity at the previous preceding area and the intensity of received light from the previous preceding area obtained in Step S13, and a corrected gain for not causing saturation by the light received from the current target area is calculated (Step S16).

Thereafter, the distance measuring part 11 sets the calculated corrected gain in the gain control part 19 (Step S17) and records the light projection timing (Step S18) as laser light is projected from the light projecting part 12 to the current target area. As reflected light from the target area is received by the main light receiving element 13 (Step S19), the outputted electrical signal is amplified by the first amplifier 14 at the corrected gain and is received by the distance measuring part 11 through the first intensity recording part 15. When the intensity of light received by the first intensity recording part 15 exceeds a predetermined value, the distance measuring part 11 determines the peak of received light on the time axis and defines it as the light reception timing (Step S20). Finally, the distance measuring part 11 calculates the distance to an object from the difference between the light projection timing and the light reception timing (Step S21).

In summary, since the auxiliary light receiving element 16 measures the reflection intensity at the next target area and the corrected gain is calculated while the main light receiving element 13 measures the distance to an object, the gain can be adjusted nearly over all distance-measuring areas without any time loss. If the intensity of received light detected by the main light receiving element 13 causes saturation, the distance to an object may be calculated by using the intensity of received light detected by the auxiliary light receiving element 16. The distance to an object may be calculated from the difference between the light projection timing and the timing of the peak in the intensity of received light detected by the auxiliary light receiving element 16.

The invention was described above by way of an example in which reflected light is received from the preceding area as a scan is only in one direction (in the direction of +X). When the scan is carried out reciprocatingly both in the +X and −X directions, two auxiliary light receiving elements for gain adjustment 16R and 16L may be set as shown in FIG. 17A. When a two-dimensional scan is carried out inclusive of the +Z and −Z directions, four auxiliary light receiving elements for gain adjustment 16L, 16R, 16U and 16D may be set as shown in FIG. 7B.

Figure 7A:
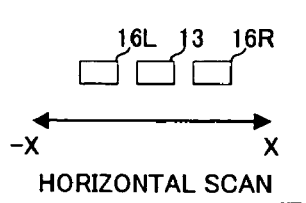
FIGS. 7A and 7B are back views of light receiving elements according too different examples of layout.
Figure 7B:
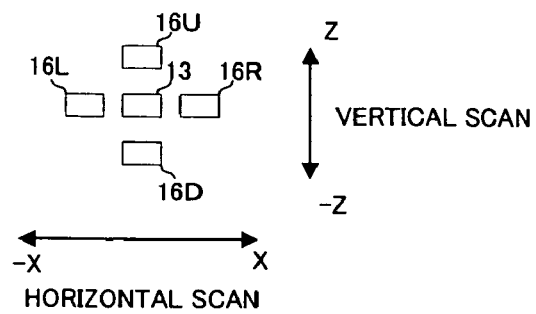

FIGS. 7A and 7B are back views of the laser scanning device of FIG. 1A to show the layout of its light receiving elements as seen from the −Y direction. FIG. 7A shows an example of setting two auxiliary light receiving elements on the left-hand side and right-hand side of a main light receiving element 13. The element 16L set on the left-hand side of the main light receiving element 13 serves to receive reflected light from the preceding area when the scan is carried out in the +X direction as shown in FIG. 2. The other element 16R set on the right-hand side of the main light receiving element 13 serves to receive reflected light from the preceding area when the scan is in the reverse direction (in the direction of −X). In other words, when the scan is in the direction of +X, the gain adjustment is carried out based on the intensity of light received by the element 16L, while the gain adjustment is based on the intensity of light received by the other element 16R when the scan is in the direction of −X. Thus, the gain adjustment can be carried out whether the scan is to the left or to the right.

FIG. 7B shows another example using four auxiliary light receiving elements for gain adjustment. The element 16U set above the main light receiving element 13 received reflected light from the preceding area on the −Z direction when the projection angle of the laser light is changed in the vertical direction as shown in FIG. 1C. The element 16D set below the main light receiving element 13 receives reflected light from the preceding area in the +Z direction. Thus, the gain adjustment is possible even when a scan in the vertical direction is carried out. If the vertical angle of the laser projection is changed at the ends of the horizontal scan, as explained above, the gain adjustment is carried out by using the elements 16U and 16D when the laser light is being projected at the end points of the horizontal scan.

Figure 8A:
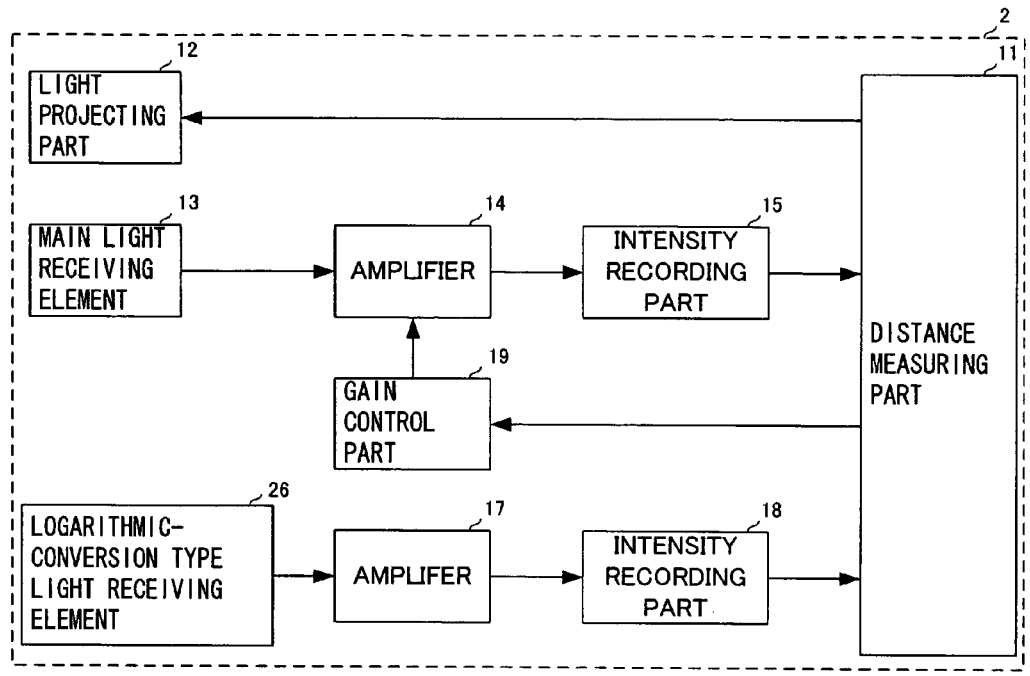
FIGS. 8A, 8B and 8C are block diagrams of other laser scanning devices according to different embodiments of the invention.
Figure 8B:
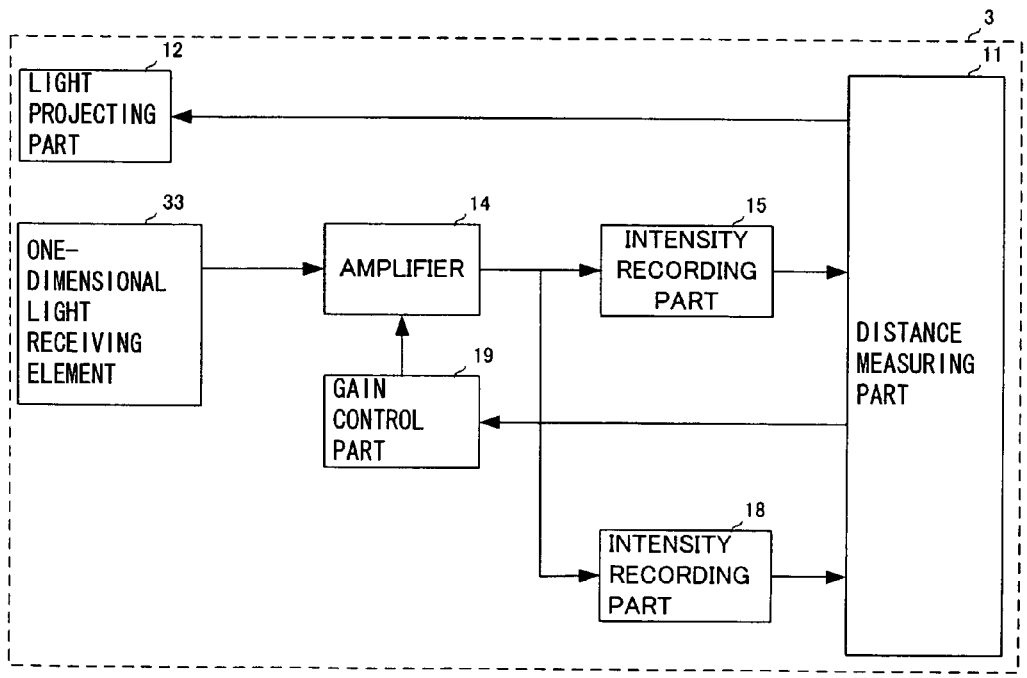
Figure 8C:
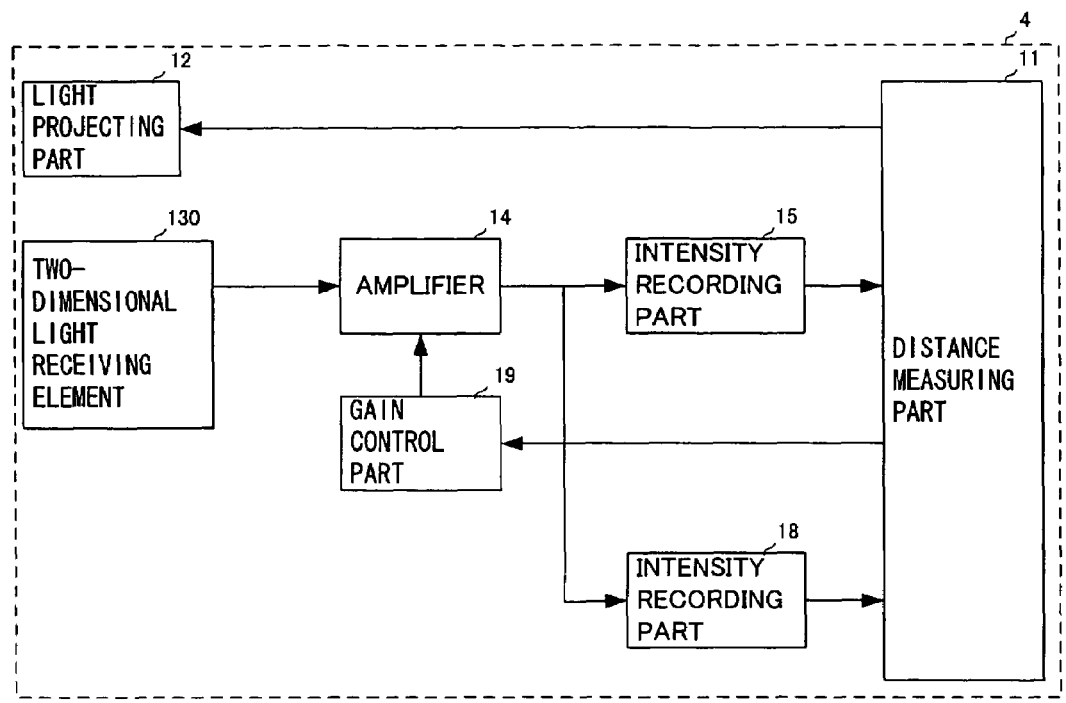

FIGS. 8A, 8B and 8C show other laser scanning devices 2, 3 and 4 having different structures (like components being indicated by the same symbols as in FIG. 4). FIG. 8A is different from FIG. 4 in that a logarithmic conversion-type light receiving element 26 is used instead of the auxiliary light receiving element 16 of FIG. 4. The logarithmic conversion-type light receiving element 26 is connected to the second amplifier 17 but the second amplifier 17 is not connected to the gain control part 19 according to this example.

The logarithmic conversion-type light receiving element 26 shown in FIG. 8A serves to output electrical signals in a logarithmic scale according to the intensity of the received reflected light, increasing the output logarithmically (more gently than the linear rise) as the intensity of the reflected light increases. It is thus capable of detecting a peak without saturation even if reflected light with a very high intensity is received and fixing the gain of the second amplifier 17. As explained above, the distance measuring part 11 obtains the ratio of the intensity of reflected light with respect to the irradiation intensity from the irradiation intensity at the gain-measuring area and the intensity of received light detected by the logarithmic conversion-type light receiving element 26 and calculates therefrom the corrected gain to be set for the first amplifier 14. Although the main light receiving element 13 may also be replaced by a logarithmic conversion-type element, a linear-scale element is used according to the present example for an improved accuracy in the detection of received light intensity such that the type of object being detected can also be estimated from the difference in the intensity of received light.

The laser scanning device 3 shown in FIG. 8B is characterized wherein a one-dimensional light receiving element 33 is used instead of the main light receiving element 13 and the auxiliary light receiving element 16 of the device 1 of FIG. 4. The one-dimensional light receiving element 33 is connected to an amplifier 14 which is connected to intensity recording parts 15 and 18.

The one-dimensional light receiving element 33 is structured with a plurality of photodiodes or the like arranged in a straight line such that reflected light from a plurality of detection areas can be detected simultaneously. The number of target areas can be varied according to the number of arranged photodiodes. Of the five target areas shown in FIG. 3, for example, any number may be treated as one target area for detecting the intensity of received light therefrom. A target area may also be divided into smaller areas.

Figure 9A:
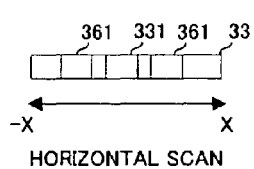
FIGS. 9A and 9B show different arrangements of light receiving elements.

FIG. 9A shows the one-dimensional light receiving element 33 as seen from the −Y direction (as defined with reference to FIG. 1A), the directions to the right and to the left being +X and −X directions, respectively. The amplifier 14 outputs the detected intensity of area 331 corresponding to a target area to the first intensity recording part 15 and the detected intensity corresponding to area proposed for the next measurement (target-to-be) to the second intensity recording part 18 as the received intensity at a gain-measuring area (either of the areas indicated by numeral 361 in FIG. 9A). The distance measuring part 11 obtains the ratio of reflected light with respect to irradiation intensity from the irradiation intensity at the gain-measuring area 361 and the intensity of received light and calculates therefrom the corrected gain to be set for the amplifier 14. The calculated corrected gain is set in the gain control part 19. If a one-dimensional light receiving element is used, a gain adjustment can be carried out flexibly on the basis of the intensity of received light at a position corresponding to a varied target area.

Figure 9B:
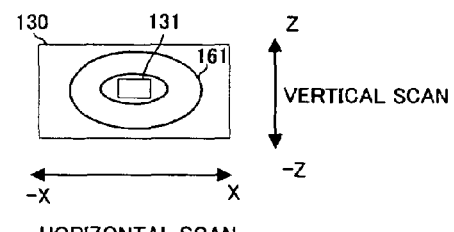
Figure 10:
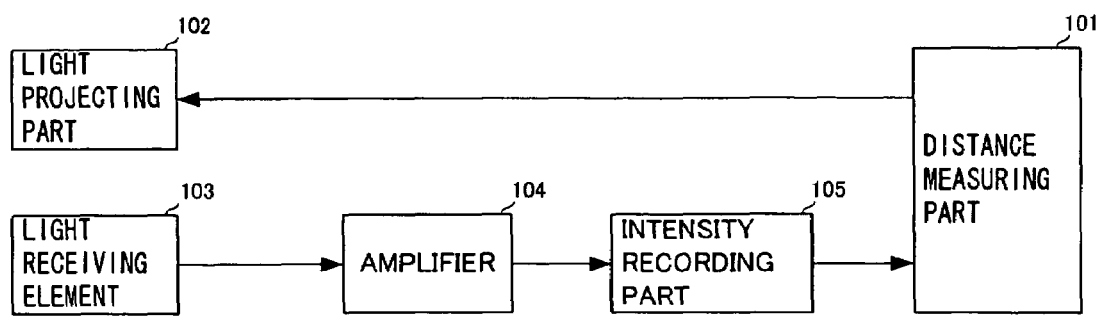
FIG. 10 is a block diagram of a prior art laser scanning device.
Figure 11A:
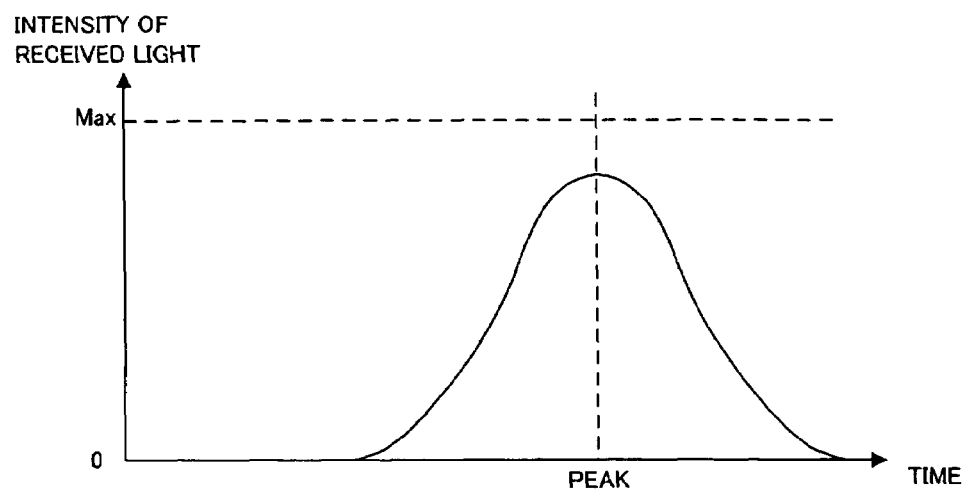
FIGS. 11A and 11B show examples of relationship between the intensity of light received by the device of FIG. 10 and time.
Figure 11B:
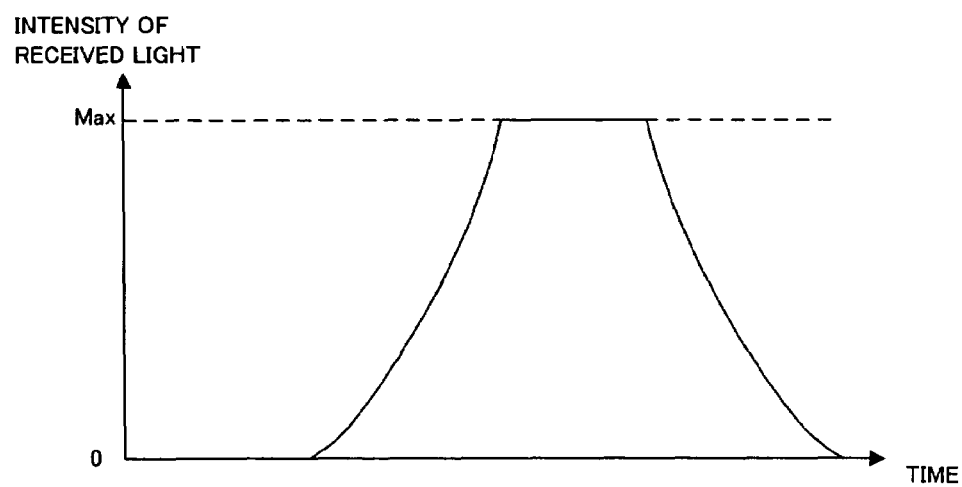

The laser scanning device 4 shown in FIG. 8C is characterized wherein a two-dimensional light receiving element 130 is used instead of the one-dimensional light receiving element 33 of FIG. 8B. FIG. 9B shows the two-dimensional light receiving element 130 as seen from the −Y direction, the upper and lower directions being +Z and −Z directions, respectively. With the two-dimensional light receiving element 130 now being used instead, as shown in FIG. 9B, a gain-measuring area 161 is set around area 131 of light receiving elements corresponding to the target area. The two-dimensional light receiving element 130 is structured with a plurality of photodiodes or the like arranged in a matrix formation, capable of simultaneously detecting reflected light from a plurality of areas arranged two-dimensionally. By using a two-dimensional light receiving element 130, the direction of scan is not limited to the horizontal and/or vertical direction. Even if a scan is carried out in a diagonal direction, the intensity of received light from an area corresponding to the next target area can be detected preliminarily such that the gain adjustment is possible at the time of measurement.

Although the invention was described above with reference to an example wherein the invention was applied to an automobile, it now goes without saying that the invention can be applied to other kinds of vehicles such as railroad cars and boats.

What is claimed is:

1. A laser scanning device comprising:
    a light projecting part for projecting laser light to irradiate a target area scanningly in a specified orientation for carrying out distance-measuring operations;
    a main light receiving element for receiving reflected light of said laser light from said target area and detecting intensity of said received reflected light;
    an auxiliary light receiving element for receiving reflected light from a preceding area which is displaced from said target area by a specified angle and detecting intensity of reflected light from said preceding area;
    amplifiers for amplifying intensities detected by said main light receiving element and said auxiliary light receiving element;
    a gain control part for adjusting the gain of said amplifiers for the next one of said distance-measuring operations based on the intensity of said projected laser light and the intensity of reflected light detected by said auxiliary light receiving element; and
    a measuring part for measuring the distance to an object from said projection timing of said projected laser light and the timing of receiving reflected laser light each time said specified angle is scanned.

2. The laser scanning device of claim 1 wherein said auxiliary light receiving element includes a first element and a second element, said first element serving to receive reflected light from a preceding area in a going direction which is one of the directions in said specified orientation, said second element serving to receive reflected light from another preceding area in a returning direction which is opposite said going direction and is the other direction in said specified orientation;
    wherein said gain control part adjusts the gain of said amplifiers for the next distance-measuring operation based on the intensity of said projected laser light and the intensity of reflected light detected by said first element when said laser scanning device is scanning in said going direction; and
    wherein said gain control part adjusts the gain of said amplifiers for the next distance-measuring operation based on the intensity of said projected laser light and the intensity of reflected light detected by said second element when said laser scanning device is scanning in said returning direction.

3. The laser scanning device of claim 1 wherein said auxiliary light receiving element is a logarithmic conversion-type light receiving element.

4. The laser scanning device of claim 2 wherein said first element and said second element are each a logarithmic conversion-type light receiving element.

5. A laser scanning device comprising:
    a light projecting part for projecting laser light to irradiate a target area scanningly in a specified orientation for carrying out distance-measuring operations;
    a one-dimensional light receiving element for simultaneously receiving reflected light of said laser light from a plurality of areas including said target area, a preceding area which is displaced by a specified angle from said target area in a going direction which is one of the directions in said specified orientation and another preceding area which is displaced by said specified angle from said target area in a returning direction which is one of the directions in said specified orientation opposite said going direction and is the other direction in said specified orientation;
    an amplifier for separately amplifying intensity of reflected light from said target and preceding areas;
    a gain control part for adjusting the gain of said amplifiers for the next one of said distance-measuring operations based on the intensity of said projected laser light and the intensity of reflected light detected by said auxiliary light receiving element.

a measuring part for measuring the distance to an object from said projection timing of said projected laser light and the timing of receiving reflected laser light each time said specified angle is scanned.

6. The laser scanning device of claim 5 wherein said one-dimensional light receiving element is a logarithmic conversion-type light receiving element.

7. A laser scanning device comprising:

a light projecting part for projecting laser light to irradiate a target area scanningly two-dimensionally for carrying out distance-measuring operations;

a two-dimensional light receiving element for simultaneously receiving reflected light of said laser light from a plurality of two-dimensionally defined areas including said target area and a plurality of preceding areas which are displaced by a specified angle from said target area in two-dimensionally varied directions and thereby detecting intensities of said received reflected light;

an amplifier for separately amplifying intensity of reflected light from said target and preceding areas;

a gain control part for adjusting the gain of said amplifiers for the next one of said distance-measuring operations based on the intensity of said projected laser light and the intensity of reflected light detected by said auxiliary light receiving element.

a measuring part for measuring the distance to an object from said projection timing of said projected laser light and the timing of receiving reflected laser light each time said specified angle is scanned.

8. The laser scanning device of claim 7 wherein said two-dimensional light receiving element is a logarithmic conversion-type light receiving element.

* * * * *